Aug. 9, 1966  D. O. EASTERLY  3,265,458

ELECTRIC DRIVE CAMERA STOP

Filed Aug. 5, 1964

DONALD O. EASTERLY
INVENTOR.

BY R. Frank Smith
Ronald S. Karch
ATTORNEYS

United States Patent Office 3,265,458
Patented August 9, 1966

3,265,458
ELECTRIC DRIVE CAMERA STOP
Donald O. Easterly, Rochester, N.Y., assignor to Eastman Kodak Company, Rochester, N.Y., a corporation of New Jersey
Filed Aug. 5, 1964, Ser. No. 387,734
13 Claims. (Cl. 352—169)

This invention relates to motion picture cameras, and more particularly to shutter operating mechanisms for electrically driven motion picture cameras.

It has always been essential to construct a motion picture camera so that its shutter will remain in a normally closed position whenever a picture sequence is not being taken. This was usually accomplished by the use of a stop linkage engaging a projection or a notch on the shutter blade in a predetermined manner to hold the shutter in a fixed closed position, thereby closing the film exposure aperture even though the shutter operating drive means, such as a wound spring motor, had stored energy to continue shutter operation. In most instances, release of an accessible camera operating button would initiate the linkage engagement.

However, with the development of electrically operated motion picture cameras, it is also essential that the electrical circuit operating such a motion picture camera be opened whenever the camera operating button is released, so that the source of electrical energy, normally batteries, will not be drained when the motion picture camera is not in use.

While there are other mechanisms available to open the electrical circuit of an electrically operated motion picture camera and actuable to engage the shutter and hold it in a closed position, it is possible for these mechanisms to be actuated in a given position of the shutter which prevents the electrical circuit from being opened even though the shutter is closed, thereby draining the energy source without awareness of this consequence by the camera operator. The present invention is characterized by the inclusion of an electrically operated motion picture camera control system which will always cause the shutter to be stopped in a normally closed position, while enabling the electrical operating circuit to be opened irrespective of the instantaneous position of the shutter when camera operation is terminated by the operator.

An important object of the present invention, therefore, resides in the provision of a motion picture camera shutter operating means having a shutter stop mechanism which will cause the shutter of the camera to assume a normally closed position whenever a picture-taking sequence is completed.

Another important object resides in the provision of a shutter stop mechanism for an electrically operated motion picture camera which will ensure that the electrical operating circuit will be open whenever a picture-taking sequence is not being taken, irrespective of the position of the shutter at the time when the camera operator terminates exposure.

Yet another object is to combine these features in a battery powered motion picture camera with a simple and inexpensive stop mechanism which is controlled in direct relation with an accessible camera operating button.

Still another object is to provide a camera operating mechanism which will accomplish these shutter stop features with reliability and without requirement for continual adjustment.

Other objects and advantages will also become apparent during the course of the following description, the accompanying drawing forming a part thereof and in which.

Figure 1:
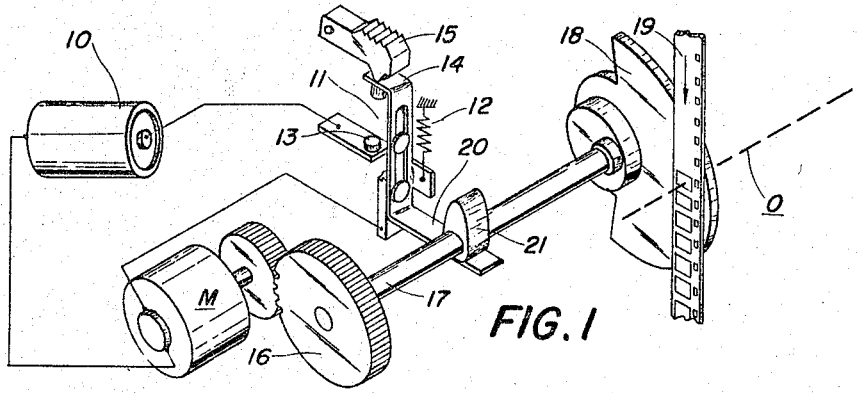
FIG. 1 represents the elements of a motion picture camera with an electrical operating circuit suitable for use with the present invention.

As shown in FIG. 1, the operating arrangement of a motion picture camera useful with the present invention comprises an electrical circuit having, in series, an electric drive motor M, a source of electrical potential consisting suitably of batteries 10, and a control switch 11 normally biased to its open position by a tension spring 12. Switch 11 comprises a fixed contact element 13 and a sliding contact element 14 of electrically conductive material. A camera operating button 15, accessible from outside the camera case (not shown), is provided to close the switch 11 by moving contact 14 downwardly against the bias of spring 12 to engage contact 13 and complete the electrical circuit for operating the camera.

The motor M is mechanically geared to a shutter drive gear 16 mounted on one end of a shutter operating shaft 17. The drive gear 16, by means of shaft 17, rotates a conventional shutter blade 18. The shutter blade 18, while rotating, intermittently interrupts or "chops" a light beam entering the camera through an exposure aperture provided on a taking lens axis O, the speed of rotation of the shutter 18 being timed to be coordinated with the intermittent feed of film 19 in the direction of the arrow, all in a manner well known in the art. The shutter blade 18 is shown in FIG. 1 to be assuming a normally closed position in which it intersects the taking lens axis O to prevent light from entering the film chamber.

Operation of the motion picture camera to take a picture sequence is accomplished by manually pressing the accessible operating button 15 to overcome the bias of spring 12 and close the electrical circuit by moving contact 14 into engagement with contact 13. Release of the button 15 will enable the spring 12 to move contact 14 away from engagement with contact 13, thereby causing the electrical circuit to be opened and camera operation terminated. However, in order to prevent the circuit from opening while the shutter 18 is open, there is provided a relatively rigid L-shaped arm 20 integrally attached to the movable contact element 14. The arm 20 is engageable with an eccentric cam member 21 carried on the shaft 17 for rotation therewith. The value of the eccentric of the cam member 21 is equal to the distance of movement of the contact 14, and while the switch 11 is held closed by the button 15, the arm 20 is free from engagement with the surface of cam member 21 to prevent wear. Whenever the operating button 15 is released, the upward urging of spring 12 causes the arm 20 to engage and ride the surface of the cam member 21. If the button 15 is released while the shutter is in an open position, the cam member 21, by way of arm 20, holds the electrical circuit closed by retaining contact element 14 down and switch 11 closed until the shutter is positively driven by the motor M to its closed position. At this time, the cam member 21 permits the follower arm 20 and contact 14 to move upwardly and open the switch 11, simultaneously terminating film feed and shutter operation.

Figure 2:
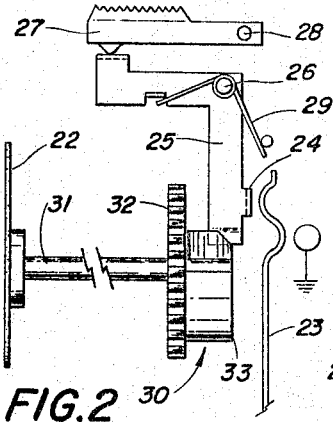
FIG. 2 is a side view of a preferred embodiment of the stop mechanism according to the present invention.
Figure 3:
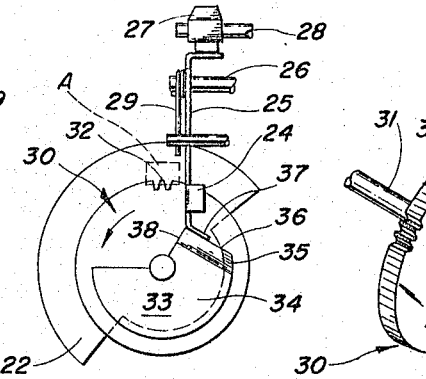
FIG. 3 is an end view of the embodiment of FIG. 2.
Figure 4:
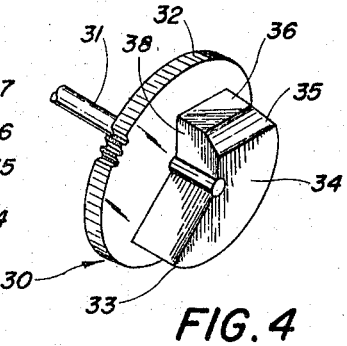
FIG. 4 is a partial perspective view showing the stop cam of FIG. 2.

With reference to the preferred embodiment of the invention shown in FIGS. 2–4, there is provided a reliale shutter operating arrangement which ensures opening of the electrical control circuit and positive stopping of a rotatable shutter blade 22 at its normally closed position covering the exposure aperture A (FIG. 3). In this embodiment, the switch comprises in part a resilient contact element 23 of electrically conductive material normally biased to an open position as shown in FIG. 2. To operate the motion picture camera and close the operating circuit (not shown but similar to FIG. 1) the switch arm 23 is moved to its closed circuit position by a contact plate 24 provided on an L-shaped stop lever arm 25, which is pivoted about an axis represented by pin 26. Pivotal movement of lever arm 25 to close the circuit is initiated by manual depression of an accessible camera control button 27, the button 27 being movable about a pivot 28 mounted on the camera body (not shown). Stop lever arm 25 is biased away from contact with the switch contact arm 23 by means of a spring 29 mounted on pin 26 coaxially with the lever 25.

The shutter operating mechanism according to the preferred embodiment further includes a stop cam disc 30 mounted for rotation at one end of a rotary shutter operating shaft 31, the shutter blade 22 being spaced from the stop cam disc 30 and at the other end of the shaft 31. Stop cam 30 comprises a driven gear portion 32 corresponding to gear 16 of FIG. 1 and a cam portion 33 defining a cam surface transverse to its axis of rotation. Gear portion 32 is shown as a spur gear, although other forms such as helical gears are suitable, and represents the means for driving the shaft 31 by cooperating with a suitable drive gear on an electric motor drive means controlled by the operating circuit (not shown but similar to FIG. 1).

The cam portion 33 of the stop cam 30 in part defines, as its cam surface, a raised arcuate circuit operating surface 34, a recessed circuit open surface represented by the side of gear portion 32, and a bevel surface 35. The bevel surface 35 is at an angle of about 45° with respect to surface 34 and extends toward the recessed surface represented by the side of gear portion 32 about one-half the height of the raised surface 34 to a stop surface 36 which is perpendicular to operating surface 34 and the recessed surface. A rectangularly shaped tab 37 at the lower end of the bottom leg of the stop lever 25 is laterally engageable with the stop surface 36 in a stop or shutter closed position to prevent further rotation of the cam 30, shaft 31 and shutter blade 22. In this stop position, the shutter blade 22 assumes its normally closed position. Preferably, the stop lever 25 is mounted eccentrically to the stop cam axis represented by shaft 31, with the tab 37 and surface 36 being at right angles to a cam edge 38 extending radially outwardly to the inner edge of tab 37 when the shutter blade 22 and cam disc 30 are in the position shown.

Tab 37 is urged into engagement with the cam surface of cam portion 33 by the urging of spring 29. The raised cam surface 34 is sufficiently high to enable it to maintain lever arm 25 in a position which retains element 23 in the closed circuit position, whenever the cam surface 34 is in the path of movement of lever arm 25. Correspondingly, the recessed portion is sufficiently low so as to permit the circuit to be opened.

Operation of a camera employing this embodiment is initiated by manually depressing the control button 27 against the bias of spring 29. Stop lever arm 25 is in turn pivoted counterclockwise, as shown in FIG. 2, and the plate 24 on stop lever 25 engages contact arm 23 to move it to its closed circuit position and actuate the electrical drive means. In this position, the inner edge of stop lever 25 is out of the path of movement of cam 30, thereby enabling smooth and continuous rotation of shutter shaft 31 by positive driving through gear portion 32. Holding the button 27 down maintains actuation of the electric drive means. When the control button 27 is released to terminate operation, spring 29 urges lever arm 25 in a clockwise direction to cause tab 37 to engage the portion of the cam surface which is then in the path of movement of the lever arm 25. If the cam surface portion is the raised surface 34, the circuit will remain closed, and the drive means will continue to drive the shutter blade 22 until the recessed surface comes into the path of movement of the lever arm 25. At this point, the shutter blade covers the exposure aperture A and the electric circuit is opened. Rotation is positively stopped as the stop surface 36 engages the tab 37.

Thus, stop lever arm 25 will engage the raised cam surface 34 whenever the control button 27 is released while the shutter is in an open position. Cam surface 34 will cause the switch arm 23 to remain in its closed position, thereby continuing energization of the electric drive motor until the shaft 31 is positively rotated sufficiently to permit stop lever 25 to be released from engagement with surface 34 and returned to its open circuit position by spring 29.

To prevent stopping of the shutter blade while the electrical circuit is closed, irrespective of the instantaneous position of the shutter 22 at the time when operating button 27 is released, there is provided the bevel surface 35 at the leading edge of the raised cam surface 34 in part to assure that the stop cam 30 and the stop lever 25 will not be caught in an edgewise engaging position which will cause the power source to be run down because of continuous energization. As can be seen, it is possible that the camera operator will release control button 27 while the leading or stop edge 36 is just below the corresponding engagement tab portion 37 of stop lever 25. Without the bevel surface 35, and because of both slight return delay and thickness of materials, it is possible that the innermost edge of tab 37 might block the shaft 31 from further rotation by edgewise engagement with cam portion 33 while yet retaining the switch in a closed, energization position.

By now providing the bevel surface 35, the leading edge 36 has a height insufficient to maintain the switch contact element 23 closed if an edgewise engagement of the stop surface 36 with tab 37 occurred, which of course is now even less likely because of the acute angle of engagement. If, however, the tab 37 first engages the flat of bevel surface 35, the rotating parts will inertially cause sufficient additional rotation to enable the lever arm 25 to be moved back to a fully closed circuit position until another shutter cycle is completed. The lowermost, or leading edge of bevel surface 35 is low enough so that an edgewise engagement would not occur until after the switch has been opened, and spring 29 will tend to rotate the cam member 30 in the opposite direction sufficiently to enable the tab 37 to laterally engage stop surface 36.

Figure 5:
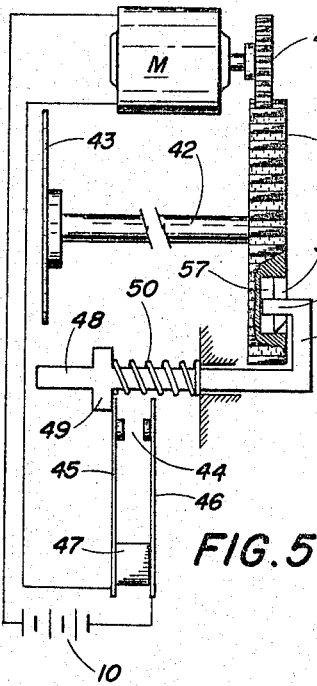
FIG. 5 is a side view of a second embodiment incorporating the present invention.
Figure 6:
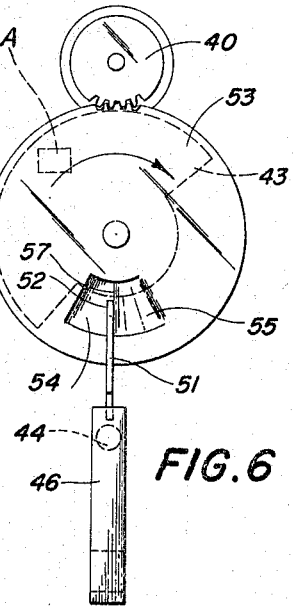
FIG. 6 is an end view of the embodiment of FIG. 5.
Figure 7:
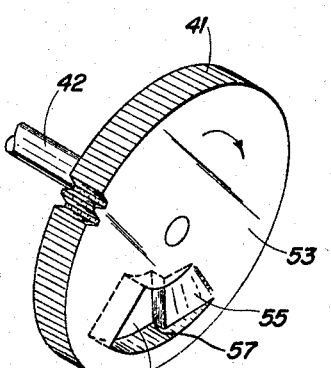
FIG. 7 is a partial perspective view showing the stop cam of FIG. 5.

In the alternative embodiment shown in FIGS. 5–7, the stop cam member is represented by a driven gear disc 41 having a cutout portion 54. As in the preferred embodiment, gear disc 41 is mounted on shaft 42 for rotation coaxially with shutter blade 43. Similarly, the electrical circuit includes in series, a source of electrical potential 10, a switch 44 having resilient switch contact elements 45 and 46, and an electric drive motor M. Correspondingly, a drive gear 40 mounted on the shaft of drive motor M drives the shutter blade 43 through gear disc 41 whenever the circuit is closed.

The accessible camera operating button in this instance is represented by a laterally slidable arm 48 having a transversely extending lug 49 engageable with switch element 45 to move element 45 into engagement with element 46 to close the circuit whenever the operating button 48 is depressed (moved to the right as shown in FIG. 5). A coaxially mounted helical spring 50 is provided to bias the button 48 to its open circuit position.

Integral with operating button 48 is an L-shaped cam engaging arm 51 having a cam follower arm and stop pin 52 normal to gear disc 41. The operating cam surface in this embodiment is defined by the right surface (FIG. 5) of gear disc 41, transverse to the axis of rotation as represented by shaft 42. The cam surface includes a raised arcuate closed circuit surface 53, an arcuate recessed surface 54, and a bevel surface 55 following the recessed surface 54 in the direction of rotation as shown by the arrow. As in the preferred embodiment, raised surface 53 is sufficiently high to retain the follower 52 and button 48 in a depressed position, thereby retaining the switch in a closed circuit position until the follower arm is permitted to be moved to the left as the recessed surface 54 rotates into the path of movement of follower arm 52. In this embodiment, both the recessed surface 54 and the bevel surface 55 have angular widths of about 30° each. Intermediate the surfaces 54 and 55 is the corresponding stop surface 57 laterally engageable with stop pin 52 to prevent further shutter blade rotation.

In operation, the accessible operating button 48 is depressed until the lug 49 forming a part of button 48 engages and closes the switch 44 to energize the drive motor M and rotate the shutter blade 43. Simultaneously, stop pin 52 is removed from the cutout portion 54 to permit shutter rotation. During normal operation, button 48 is held down and pin 52 remains clear of cam surface 53 on the face of gear 41. As the button 48 is released upon completion of a picture taking sequence, the compression spring 50 urges the button 48 and follower arm 52 to the left as shown in FIG. 5. If the arm 52 engages surface 53 at the time of release, the switch will remain closed and energization continues until the recessed surface 54 moves under follower arm 52, thereby enabling the arm 48 to move further to the left and open switch 44. In this position, the shutter blade 43 closes the exposure aperture A, as shown in FIG. 6. To prevent an accidental locking of the shutter blade 43 while the switch 44 is in the closed position, the beveled surface 55 is again provided at the leading edge of raised surface 53 to cause the pin 52 to be pushed back to its closed circuit position by the inertial forces of the rotating parts until another shutter cycle is completed. Here, again, the leading or stop edge 57 is low enough in order that the switch 44 will be open in the event that this is engaged by the leading edge of pin 52 at the time the operating button 48 is released.

Obviously, other embodiments and modifications are now readily apparent, and it is to be understood that such changes can be resorted to without departing from the spirit of the invention or the scope of the subjoined claims.

I claim:

1. In a motion picture camera having electric drive means to drive a light control shutter movable intermittently between open and closed positions, the improvement of:
   switch means biased to assume a normally open position and movable to a closed position to actuate the electric drive means and drive the shutter;
   manually movable means operable to move the switch means to its closed position and actuate the electric drive means and to permit the switch means to assume its open position on release of the manual means; and
   cam means movable with the shutter and defining a first surface to engage and retain the switch means in the closed position and maintain activation of the electric drive means whenever the manual means is released while the shutter is in its open position, the cam means further defining a second surface operable to permit the switch means to assume its open position as soon as the shutter moves to its closed position after said release, and bevel surface means intermediate the first and second surfaces configured to cause the switch means to be moved back to its closed position whenever the bevel surface means engages the switch means on release of the manual means.

2. In a motion picture camera having a shutter blade rotatable across a picture taking axis in alternately open and closed positions, and an electric circuit including electric drive means operable to rotate the shutter blade, the improvement comprising:
   movable switch means operable to open and close the electric circuit and means biasing the switch means to an open circuit position;
   manual means overcoming the biasing means to selectively move the switch means to and retain the switch means in a closed circuit position, the biasing means urging the switch means toward its open circuit position on release of the manual means; and
   cam means engageable with the manual means and rotating with the shutter blade to overcome the biasing means and retain the switch means in its closed circuit position whenever the manual means is released while the shutter blade is in its open position, the cam means defining a first cam surface engaging the manual means and causing the manual means to retain the switch means in its closed circuit position, whenever the shutter blade is in its open position, a second cam surface following the first surface in the direction of rotation permitting the switch means to be moved by the biasing means to its open circuit position, and a third cam surface following the second surface in the direction of rotation engageable with the manual means to move the switch means back to its closed circuit position to rotate the shutter blade by the electric drive means whenever the manual means is released while the third surface is in a position to engage the manual means, thereby preventing the shutter blade from being in a closed position while the switch means is in a closed circuit position.

3. The improvement according to claim 2 wherein the cam means comprises a cam disc separate from the shutter blade and further comprising a rotatable shaft mounting the cam disc for rotation about an axis coaxially with the shutter blade.

4. The improvement according to claim 3 wherein the switch means comprises a circuit switch element biased to the open position, and the manual means includes a movable arm engageable with the circuit switch element and having a follower portion for following the cam surfaces, and a spring biasing the arm away from engagement with the switch element and to a position for following the cam surfaces.

5. The improvement according to claim 4 wherein the cam surfaces are defined by a side of said disc transverse to the axis of rotation, and the cam side comprises an arcuate raised portion defining the first cam surface holding the arm in engagement with the switch element and an arcuate recessed portion defining the second cam surface permitting the arm to be biased away from said switch element by said spring.

6. The improvement according to claim 5 wherein the third cam surface is defined by a beveled portion between the recessed portion and the raised portion in the direction of rotation of the cam disc to engage the following arm and move the arm to cause the follower portion to follow the first surface and prevent stopping of the shutter blade with the switch means in its closed circuit position.

7. The improvement according to claim 6 wherein the cam disc further defines a stop surface intermediate the recessed portion and the beveled portion to laterally engage the follower portion of the arm and hold the shutter blade in its closed position to prevent the arm from being moved from the second cam surface onto the third cam surface.

8. The improvement according to claim 6 wherein the position of the third cam surface immediately adjacent the second cam surface permits the biasing means to move the switch means to its open position, and the spring is sufficient to cause the arm to engage the third cam surface at the immediately adjacent portion and cause the cam means and shutter blade to rotate a small amount in the opposite direction until the follower portion of the arm engages the second cam surface.

9. The improvement according to claim 2 wherein the cam means defines a stop surface intermediate the second and third cam surfaces to hold the shutter blade in its closed position and to prevent the manual means from moving from engagement with the second surface to engagement with the third surface after said release.

10. A shutter mechanism in an electrically driven motion picture camera, comprising:
a rotatable shutter blade;
an electric circuit including drive means when actuated for rotating the shutter blade in one direction between alternate open and closed positions in relation to a picture taking axis;
an electric switch operable to control the electric circuit and having a switch element movable between a normally open circuit position and a closed circuit position in which the drive means is actuated;
a selectively movable arm engageable with the switch element to move the element to its closed circuit position and permit the switch element to move to its open position on release of the arm; and
a cam member mounted for rotation with the shutter blade, the cam member defining a cam surface transverse to its axis of rotation and engageable with the selectively movable arm on release of the arm to control the position of the arm, and spring means urging the arm into engagement with the portion of the cam surface in the path of movement of the arm, the cam surface including a first surface portion in the path of movement of the arm whenever the shutter blade is in its open position and operable to engage the arm on said release and retain the element in its closed circuit position to maintain actuation of the drive means and shutter blade rotation, a second surface portion following the first surface portion in the direction of rotation in the path of movement of the arm operable to permit the switch element to move to its open position on release of the arm when the shutter blade moves to its closed position, and a third surface portion following the second surface portion in the direction of rotation operable on release of the arm when in the path of movement of the arm to move the arm back into engagement with the first surface portion to maintain actuation of the drive means and continue rotation of the shutter blade until the second surface portion is in the path of the arm movement.

11. The shutter mechanism according to claim 10 wherein the cam member further defines a stop surface intermediate the second and third surface portions and operable to engage the arm and prevent further rotation of the cam member and shutter blade only when the switch element is in its open circuit position.

12. The shutter mechanism according to claim 11 wherein the cam member comprises a rotatable disc defining a driving surface on its periphery forming a part of the drive means, a raised arcuate portion forming the first surface portion, a recessed arcuate portion forming the second surface portion, and a beveled portion forming the third surface and contiguous at one edge with the raised arcuate portion, the other edge of the beveled portion terminating with a side vertical with respect to the recessed arcuate portion and the said stop surface.

13. The shutter mechanism according to claim 12 wherein the selectively movable arm comprises a L-shaped lever member, and comprising an accessible operating button engageable with one leg of the lever member to move the other leg of the lever member into engagement with the switch element, and a tab at the outer end of the other leg of the lever member engageable with the cam surface of the cam member.

References Cited by the Applicant
UNITED STATES PATENTS

| | | |
|---|---|---|
| 2,667,808 | 2/1954 | A. H. Hart. |
| 3,079,836 | 3/1963 | K. Schaefer. |
| 3,094,033 | 3/1963 | Thiele et al. |
| 3,106,126 | 10/1963 | R. A. Kirk. |

JULIA E. COINER, *Primary Examiner.*